W. B. BILLINGS.
Baker attached to Coal Oil Lamp.
No. 44,700.  Patented Oct. 18, 1864.
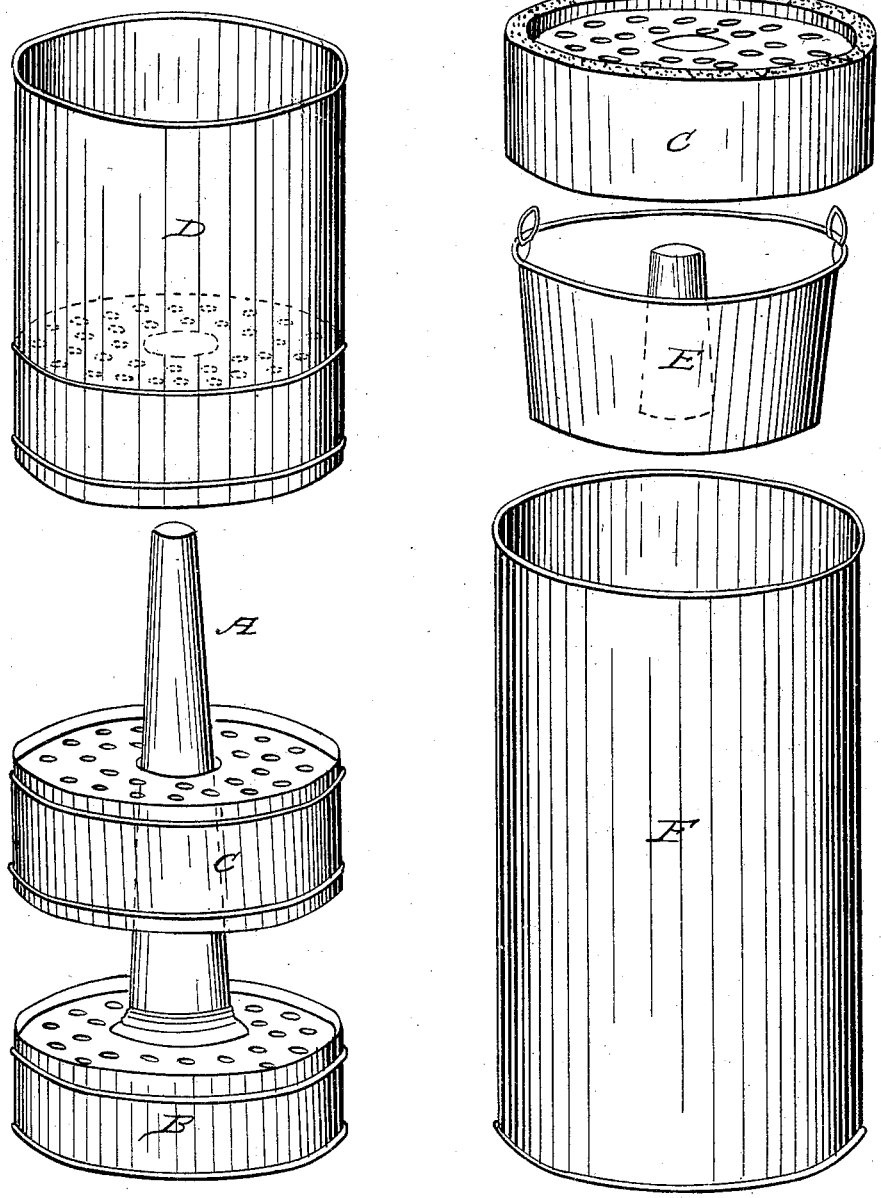

UNITED STATES PATENT OFFICE.

WILLIAM B. BILLINGS, OF NEW YORK, N. Y.

BAKER ATTACHED TO COAL-OIL LAMP.

Specification forming part of Letters Patent No. 44,700, dated October 18, 1864.

*To all whom it may concern:*

Be it known that I, WILLIAM B. BILLINGS, of New York, in the county and State of New York, have invented a new and improved oven for baking and other purposes, over a lamp burning oil or fat, whether of mineral, vegetable, or animal derivation, or over any ordinary spirit-lamp, gas, or charcoal stove or heater; and I do hereby declare that the following is a full and exact description thereof, reference being had to the accompanying drawings, and to the letters of reference marked thereon.

The nature of this invention consists in constructing an oven which can be applied to and used with a flue or chimney—such, for instance, as is used in the boilers and heaters described in the specification and drawings of Warren L. Fish, to whom Letters Patent of the United States have been granted, dated, respectively, as follows: June 17, 1862, reissued December 23, 1862, again reissued January 5, 1864, and February 24, 1863.

To enable others skilled in the art to make and use my invention, I will now proceed to describe its construction and operation.

I construct a vessel of sheet metal, about the same length or height as the flue or chimney over and around which it is to be placed, and which may be from six to fifteen inches; but of course when the flue is to be used on the ordinary coal-oil lamp, the length or height of the chimney must be adapted to the particular burner used. The shape of this vessel or oven may be round, oval, square, many-sided, or any particular form to suit taste or circumstances. The diameter may be from six to twelve inches. The proportions of length and diameter of my oven should be about the same as that of the said boilers and heaters described by Warren L. Fish in his patents aforesaid; but while the said boilers and heaters are constructed so as to be each complete in one piece, I construct my improved oven in sections or parts, as shown in the annexed drawings, in which A represents the flue or chimney; B C D, sections or parts of the oven, which are made to fit onto one another, over and around the flue A, and each of these sections are provided with a diaphragm, which may be fixed or movable. These diaphragms may for some purposes be perforated.

To exemplify, for baking a loaf of bread, a dish, as shown at E in the drawings, is or may be used. For boiling or stewing it is necessary to make this vessel water-tight, and to place it on top of the oven inside or in place of the top section; and I find that water will boil in this vessel in about the same time that it takes to bake biscuit and potatoes in sections B C.

On top of the oven and over the flue a pan may be placed for frying or stewing in the same manner as now used on the boilers and heaters aforesaid. This pan may be supported by a stand or plate covering the orifice of the top section.

It will be readily seen that with an oven constructed substantially as described two or more loaves or other substances can be baked, water or liquid boiled, meat fried, or a stew made all at one and the same time over the flame or heat of one lamp or burner.

It is desirable, though by no means necessary, that a shield or some protection be placed around the oven to keep the cold air from coming directly in contact with it, for when this is done the oven will work more efficiently and rapidly. I will describe two ways in which this may be effected.

First. I construct a jacket or shell, F, about half an inch larger in diameter than the oven, and I place it over and around the oven, adjusting the jacket or shell so that it will be at equal distance from the oven at all points. I then fit a close cover around the top of the flue A and over the oven and jacket, to prevent air from passing up between the jacket or shell and the oven.

Second. I construct a jacket around each section or part of the oven, leaving a space all around of about half an inch. This space is then filled with a packing composed of any good non conducting substance—such as pulverized charcoal, granulated cork-wood, or asbestus. The packing I put in so firm and solid as to hold the jacket in its place without any or but very little metal connection between the jacket and the oven. A rim turned inward on the bottom of each section of the jacket, and nearly touching the oven, will prevent the packing from working out by constant use, and after the packing is in its place and the space entirely filled a top rim can be soldered onto the jacket to keep the packing from working out over the top. This latter manner of protecting the oven, though more expensive than the whole jacket F, is far preferable in many respects; but the test of long and constant use can only decide which of the two methods will be best.

I shall not describe any particular way or manner of attaching my improved oven to any lamp, gas-stove, or heater. The manner of doing this already referred to in the aforesaid drawings and specifications of the said Warren L. Fish is the one I design to use with my improved oven; but it is apparent that my oven, constructed substantially as described, can be applied to and used with a great variety of heaters and stoves.

From the above it will appear that the apparatus described is susceptible of many modifications in the general arrangement or construction of parts without departure from the principle of my invention. Thus, instead of constructing the heating vessel or oven in detached parts for the purpose of giving access to each of the sections or compartments of which the said oven is composed, it may be made in one piece, and it may be provided with doors, slides, or other equivalent device for the purpose of allowing access to each of the compartments of the oven.

Having thus described my invention, I claim—

1. The employment, in connection with or as an attachment to the burner or burners of oil or gas lamps, of a heater or oven for baking and other purposes, the same consisting of a vessel divided into compartments or sections by means of partitions, the whole being arranged for operation substantially as set forth.

2. In combination with a central flue or chimney of a coal-oil or other lamp, a heater or oven, when divided into compartments, as described, surrounding said flue or chimney, substantially as and for the purpose set forth.

3. The employment, in combination with a heater or oven divided into compartments, as described, and surrounding the flue or chimney of a coal-oil or gas lamp, as described, of perforated partition-plates, whether stationary or removable, substantially as set forth.

4. The construction of the oven or heater to be used in connection with and as attachment to a coal-oil or other lamp in sections fitting one over the other, substantially as and for the purposes set forth.

In testimony whereof I have signed my name to this specification before two subscribing witnesses.

W. B. BILLINGS.

Witnesses:
WM. D. RUPUS,
A. H. TIFFT.